May 13, 1969  K. E. JACOBSON ET AL  3,443,747
FLUID COUPLING FOR CONTINUOUS FLOW CENTRIFUGE
Filed Oct. 14, 1966  Sheet 1 of 3
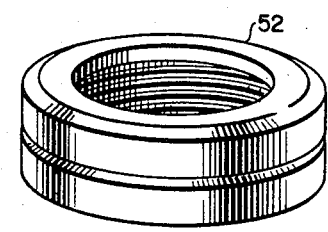
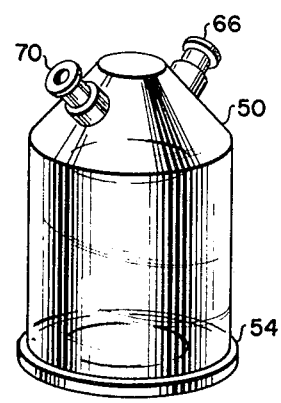
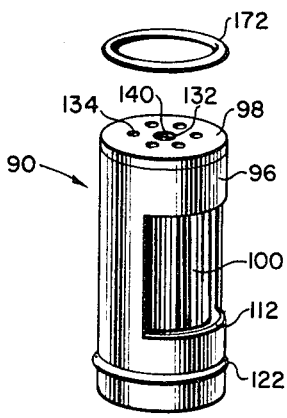
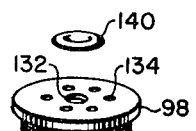
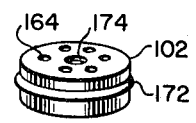
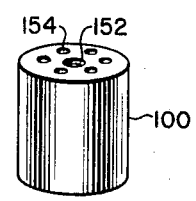
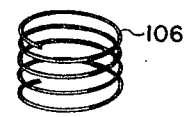
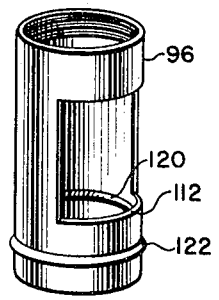
FIG. 1  FIG. 2
INVENTORS
KENNETH E. JACOBSON
JOHN T. TAYLOR
BY Louis Mok
ATTORNEY

INVENTORS
KENNETH E. JACOBSON
JOHN T. TAYLOR

United States Patent Office 3,443,747
Patented May 13, 1969

3,443,747
FLUID COUPLING FOR CONTINUOUS FLOW CENTRIFUGE
Kenneth E. Jacobson, Fremont, and John T. Taylor, Santa Clara, Calif., assignors to Beckman Instruments, Inc., a corporation of California
Filed Oct. 14, 1966, Ser. No. 586,838
Int. Cl. B04b 9/06
U.S. Cl. 233—22      17 Claims

ABSTRACT OF THE DISCLOSURE

A sealing cartridge for use with a continuous flow centrifuge comprising a rotary sealing element tightly secured to a centrifuge rotor shaft and sandwiched between a pair of nonrotatable sealing elements preloaded into sealing engagement with the rotating sealing element by a spring. The sealing elements being contained within a sleeve-cap combination forming a housing which is in turn disposed inside a suitable stationary enclosure in such a manner that there is provided sufficient clearance between the sealing elements, the housing, and the inside wall of the stationary enclosure to accommodate axial, lateral, and tilting movements of the rotor shaft and seal cartridge without leakage.

---

This invention relates generally to continuous flow centrifuge apparatus and more particularly, to improved fluid couplings for connecting the rotor interior with stationary portions of the apparatus.

In its simplest form, a continuous flow centrifuge comprises a hollow rotor mounted for rotation in a vacuum chamber with sample fluid being continuously supplied to, and removed from, the rotor interior via a shaft assembly mounted on the upper part of the rotor. The shaft assembly includes sample inlet and outlet passage means for connecting the core and periphery of the rotor interior, through a suitable fluid coupling, with the stationary external sample supply and removal apparatus.

Numerous problems are associated with the fluid couplings utilized in continuous flow centrifuges. For example, leakage often results because of separation of the rotating and non-rotating sealing members caused by axial, lateral or tilting movements, or a combination thereof, of the rotor shaft assembly during operation. In addition, in some couplings utilizing spring means to bias the stationary and rotating parts into sealing engagement, the spring force is overcome when the pressure of the fluid being processed exceeds a certain value and unseating of the sealing means, and consequently leakage, occurs. Leakage also results when the lapped sealing surfaces become damaged through mishandling during cleaning of the fluid coupling parts.

Accordingly, it is an overall object of the present invention to provide an improved fluid coupling for conducting sample fluid to and from the rotor of a continuous flow centrifuge.

It is a more specific object of the present invention to provide an improved, substantially leakproof fluid coupling for a continuous flow centrifuge rotor which floats to accommodate axial, lateral and tilting movements of the rotor.

It is another object of the present invention to provide an improved fluid coupling for a continuous flow centrifuge in which the pressure of the sample fluid being processed is used in conjunction with a resilient preloading means to sealingly bias the coupling and thereby minimize leakage and wear of the sealing faces.

It is yet another object of the present invention to provide an improved rotary fluid coupling which may be cleaned without disassembly thereby preventing damage to the sealing surfaces.

The novel features which are believed to be characteristic of the invention are set forth with particularity in the appended claims. The invention itself, however, together with further objects and advantages thereof, can best be understood by reference to the following description taken in connection with the accompanying drawings in which:

FIG. 1 is an exploded, perspective view of an exemplary embodiment of a fluid coupling, comprising generally a seal cartridge and cartridge enclosure in accordance with the present invention;

FIG. 2 is an exploded, perspective view of the seal cartridge portion of the fluid coupling shown in FIG. 1;

Figure 3:
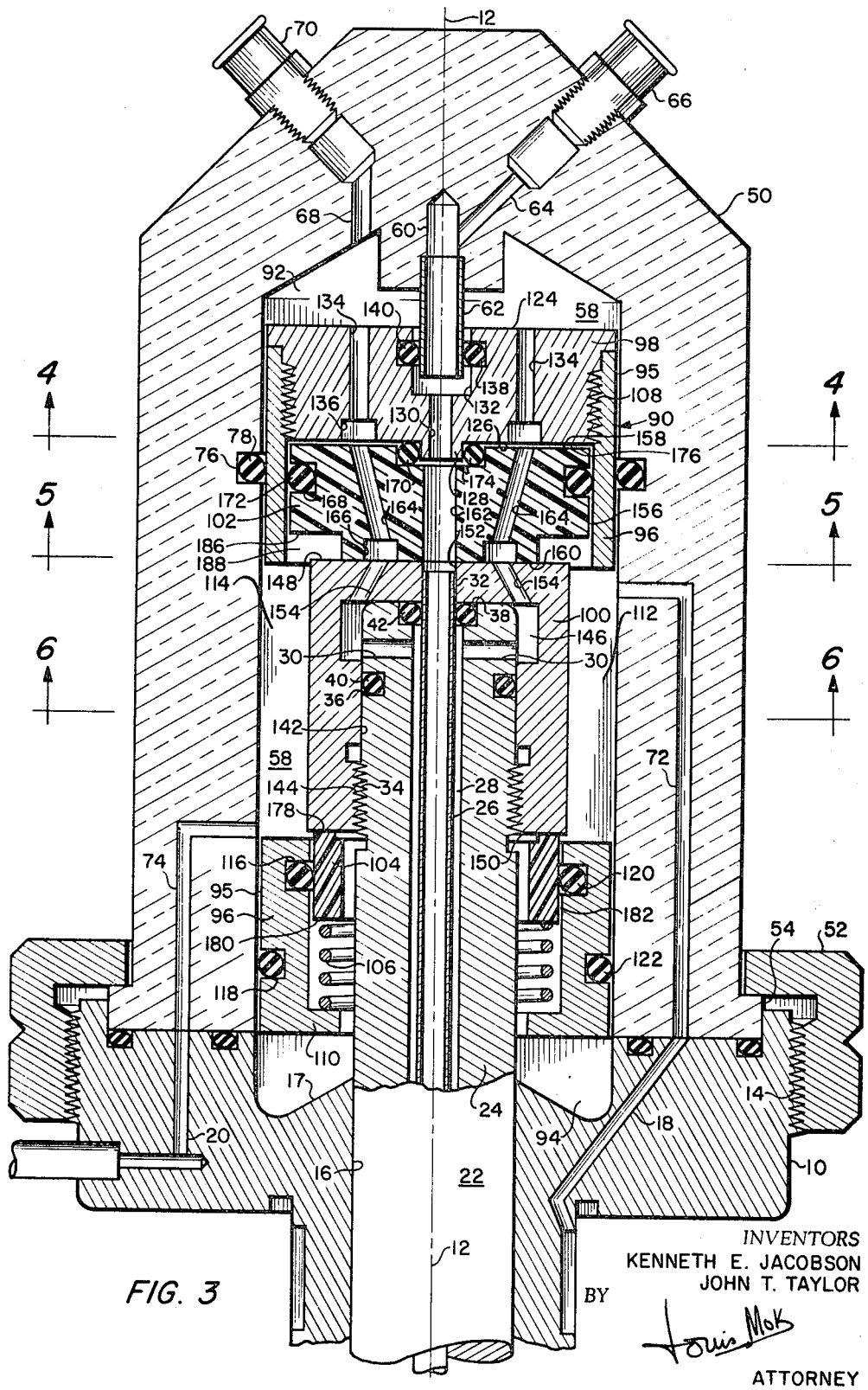
FIG. 3 is an elevation view, in section, of the seal cartridge and enclosure of FIGS. 1 and 2 shown assembled over the upper end of the rotor sample supply and removal shaft assembly.
Figure 4:
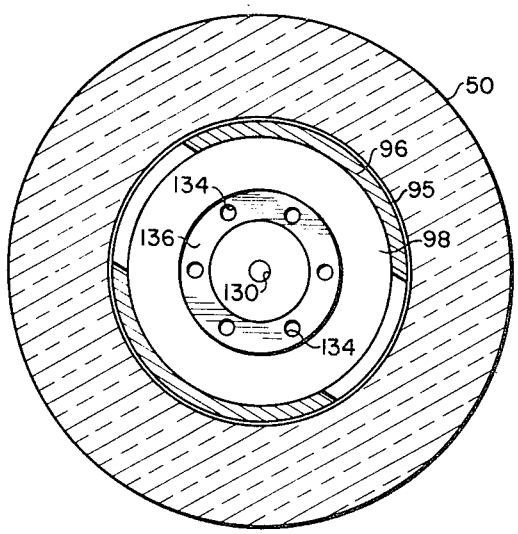
FIG. 4 is a cross sectional view of the apparatus of FIG. 3 taken along the plane 4—4.

Turning now to the drawings, the reference numeral 10 represents generally the upper vacuum-damper bearing mounted over the vacuum chamber which houses the centrifuge rotor (not shown) having an axis of rotation 12. The bearing 10 may be fabricated of nonporous bearing bronze and is provided with external threading 14, a bore 16 substantially coaxial with the rotational axis 12 of the rotor, a central depressed portion 17 and passages 18 and 20 for conducting coolant as will presently be described.

A sample fluid supply and discharge shaft assembly 22 extends upwardly from the rotor through the bore 16 in the bearing 10. Assembly 22 includes an outer tube 24 and an inner tube 26, these tubes being substantially coaxial thereby defining an annular channel 28 between them. The upper end of the outer tube 24 is provided with radial holes 30 in fluid communication with the annular channel 28. The inner tube 26 is somewhat longer than the outer tube 24, a portion 32 of the inner tube 26 thereby projecting from the top end of the outer tube 24. The outer surface of the tube 24 is provided with threads as shown at 34 and with grooves 36 and 38 for receiving sealing O-rings 40 and 42, respectively. The holes 30 together with the channel 28 form a sample inlet passage to the rotor and the inner tube 26 defines a sample outlet passage leading from the rotor.

The upper portion of the shaft assembly 22 projects into an outer, stationary enclosure 50 mounted on the damper bearing 10 and secured in place on the bearing by an aluminum ring nut 52 received by the threads 14 and engaging a flange 54 extending outwardly from the lower end of the enclosure 50. The enclosure 50 may be fabricated of any suitable material, such as a transparent acrylic plastic, for example, and may be cylindrical in shape, its vertical axis being substantially coincident with the rotor axis 12 when locked in place on the bearing 10. The enclosure 50 is provided with a generally cylindrical chamber 58 disposed coaxially of the axis 12 and extending upwardly from the lower surface of the enclosure 50. The upper end of the enclosure 50 is provided with a centrally located bore 60 having a somewhat enlarged lower end to receive, in a press fit, a short length of clear plastic tubing 62 which projects downwardly into the chamber 58. A conduit 64 formed in the enclosure 50, together with a threaded fitting 66 interconnect the bore 60 with the enclosure exterior, the fitting 66 being adapted to couple to a sample discharge line. Also formed in the enclosure 50 is a sample inlet conduit 68 having an enlarged threaded outer end for receiving a fitting 70 for connection to a sample fluid inlet line. Communicating with the chamber 58 is a coolant inlet passage 72 which is in registry with the passage 18 in the bearing 10 when the enclosure 50 is secured in place. Diametrically opposed to the passage 72 is a coolant passage 74 which is in fluid communication with the passage 20 in the bearing 10. In the upper portion of the wall defining chamber 50 is a groove 76 adapted to retain an O-ring seal 78.

Secured to the upper end of the shaft assembly 22 and disposed in the chamber 58 is a seal cartridge, generally designated by the reference numeral 90, the function of which is to provide a leakproof fluid coupling between the rotating rotor and shaft assembly on the one hand and the stationary sample fluid supply and removal apparatus externnal of the centrifuge on the other. Spaces 92 and 94, respectively, above and below the seal cartridge 90 permit the cartridge to ride up and down within the enclosure 50 to accommodate vertical movements of the rotor and shaft assembly. A clearance space 95 is provided around the seal cartridge for accommodating, within limits, lateral and tilting movements of the cartridge.

The seal cartridge 90 comprises generally a housing or sleeve 96 having a cap 98, a seal element 100 adapted to rotate with the shaft assembly 22, upper and lower, nonrotatable seal members 102 and 104, respectively, and spring bias means 106. The sleeve 96 may be generally cylindrical in shape and is provided with an inwardly-directed flange or lip 110 at the lower end and internal threading 108 at the top for receiving the cap 98. A pair of diametrically opposed, rectangularly-shaped ports 112 and 114 are formed in the wall of the sleeve 96 for conducting coolant to and from the sleeve interior. The lower portion of the sleeve 96 further includes internal and external grooves 116 and 118, respectively, for retaining O-ring seals 120 and 122. The sleeve diameter is somewhat smaller than the diameter of the chamber 58 to provide the clearance 95 described earlier. In a typical unit, the diameter of the chamber is about .812 inch and the outside diameter of the sleeve is about .792 inch, resulting in a clearance space measuring approximately .010 inch.

The cap 98 has an upper surface 124 and a lower surface 126. Depending from the lower surface 126 of the cap 98 is a boss 128, concentric with the outer surface of the cap. A central passage 130 having a bored out portion as shown at 132, extends vertically through the cap 98 and a series of passages 134 surrounds the centrally located passage 130. An annular groove 136, formed in the lower surface 126 of the cap 98, interconnects all of the passages 134 and provides continuous, fluid communication between them. A groove 138, formed in the wall of the bore 132, receives an O-ring 140 which fits about the tube 62.

The rotatable sealing element 100, which may be fabricated of any suitable, noncorrosible material such as a hardened or hard-faced corrosion resistant steel, has a generally cylindrical outer shape and is provided with a centrally disposed, cylindrically shaped internal cavity 142 having threads 144 in the wall thereof for receiving the threaded upper end of the tube 24. With the element 100 secured in place on the shaft assembly 22, these parts rotate as a unit along with the rotor. The directions of threads 34 and 144 are such that the element 100 tends to tighten down onto the tube 24 during rotor operation. The upper end of the cavity 142 is laterally recessed to form an annular chamber 146 which is in fluid communication with the radial holes 30 in the shaft assembly 22 when the element 100 is in place. The rotating sealing element 100 further has an upper sealing face 148 and a lower sealing face 150 which extend substantially perpendicular to the shaft axis 12. A central passage 152 is provided in the sealing element 100 for receiving the projecting end 32 of the inner tube 26. A series of passages 154, arranged in ringlike fashion about the central passage 152 interconnect the upper sealing face 148 and the annular chamber 146.

The rotatable sealing element 100 is sandwiched between the upper and lower, nonrotatable sealing members 102 and 104, respectively. Members 102 and 104 may be made of any suitable bearing material which is chemically inert and has a broad temperature range and low coefficient of friction. The well known nonlubricated bearing materials based on tetrafluoroethylene polymers, as for example, the material sold under the trade name "Rulon A," have especially advantageous characteristics for this purpose.

Figure 5:
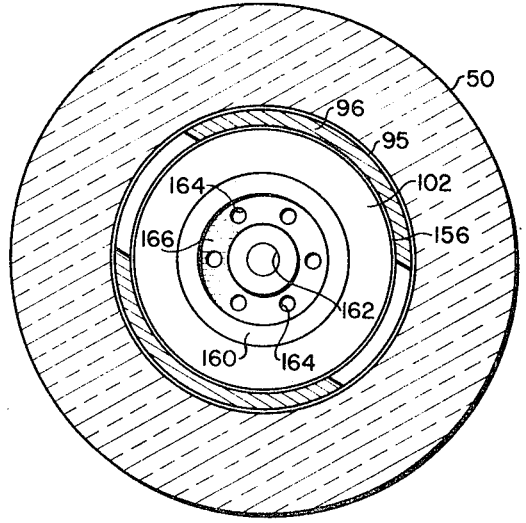
FIG. 5 is a cross sectional view of the apparatus of FIG. 3 taken along the plane 5—5.

The upper sealing member 102 is cylindrical in shape, having a diameter smaller than the adjacent inside diameter of the sleeve 96 so as to provide an annular clearance space 156. In the typical unit, the clearance space 156 measures approximately .008 inch, the inside diameter of the sleeve being about .688 inch and the outside diameter of the member 102 measuring about .672 inch. The member 102 is provided with upper and lower surfaces 158 and 160, respectively, the latter being in sealing engagement with the upper sealing face 148 of the rotatable element 100. Interconnecting the upper and lower surfaces 158 and 160 are a central opening 162, in alignment with the passages 130 and 152, and a plurality of spaced passages 164 surrounding the passage 162 (FIG. 5) and communicating with the groove 136 in the cap 98. An annular groove 166 in the lower surface 160 of the member 102, connecting the passages 164, insures that these passages will be in continuous fluid communication with the passages 154 in the rotating element 100. The member 102 is further provided with a groove 168 in the outer surface and a central recess 170 in the upper surface 158 for receiving O-ring seals 172 and 174, respectively. The depth of the recess 170 is such that in the uncompressed state, the O-ring 174 projects above the surface 158 thereby providing a clearance space 176, during normal operating pressures, between the member 102 and the cap 98. This clearance will normally be several thousandths of an inch.

The lower sealing member 104 is preferably ring-shaped, the shaft assembly 22 passing upward through the open interior. This sealing member has a lower surface 180 and an upper sealing surface 178 which rides in sealing contact with the lower sealing face 150 of the rotatable element 100. A clearance space 182 of about .007 inch is provided about the member 104.

The spring 106, compressed between the lower surface 180 of the sealing member 104 and the lip 110, provides the necessary sealing preload.

In operation, sample fluid admitted via the fitting 70 and conduit 68 flows into the space 92, through the passages 134, 164, 154, into the annular chamber 146, the radial passages 30 and from there into the annular passage 28 in the shaft assembly 22. The sample fluid, after being processed in the rotor, flows up the inner tube 26, from there through passages 152, 162 and 130, into the bore 132 and out through the tube 62 and outlet conduit 64. The tube 62, in cooperation with the O-ring 140, serves to isolate the inlet fluid from the outlet fluid yet permits the cartridge 90 to ride up and down as necessary to accommodate vertical movements of the rotor.

Figure 6:
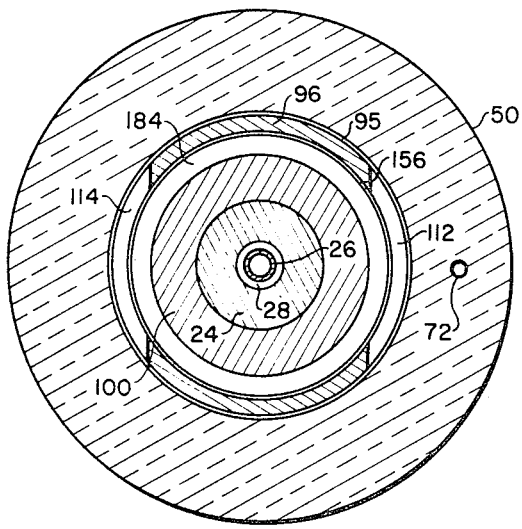
FIG. 6 is a cross sectional view of the apparatus of FIG. 3 taken along the plane 6—6.

During operation of the centrifuge, coolant is conducted through passages 18 and 72, through the port 112, around the rotating sealing element 100 and then out via port 114 and passages 74 and 20. It will be seen that an annular space 184 (FIG. 6) is defined by the sleeve 96 and the rotating element 100 which serves as a cooling jacket for the various seal cartridge components. To enhance the cooling of sealing member 102 and to keep the area of the lower sealing face 160 of this member to a minimum, a peripheral step 186 may be provided in the lower face 160 so that coolant may circulate in the annular cavity 188 thus formed. With respect to cooling of the lower sealing element 104, it will be observed that the upper end of this member projects a short distance up into the cooling jacket 184 so as to be exposed to the coolant flow therein. The O-rings 78 and 122, besides functioning as a resilient mounting for the cartridge 90, prevent coolant from reaching other parts of the centrifuge apparatus.

The spring 106 produces a biasing force, or preload, which creates a minimum level of sealing pressure between the various sealing surfaces of the cartridge. The bias provided by the spring 106, which may typically be in the order of 1.5 lbs., is sufficient to overcome any forces generated by the coolant which tend to move the sealing members 102 and 104 away from the rotating element 100. Additional sealing force is provided by the sample fluid being processed as follows: The pressure of the sample fluid conducted through the passages 134 and 164, for example, creates lifting forces in the annular grooves 136 and 166, respectively. These lifting forces push upwardly on cap 98 of sleeve 90 and non-rotating sealing element 102 tending to separate the seal formed between the lower sealing surface 160 of sealing element 102 and the upper sealing surface 148 of rotating sealing element 100. It should be noted that sleeve 90 is free to move up or down in a vertical direction within chamber 58 formed by enclosure 50. It follows that since cap 98 is threadedly secured to the top of sleeve 90 the internal forces produced over the area defined by annular groove 136 formed in the lower surface of cap 98 tend to move cap 98 and sleeve 90 together in an upward direction. The lifting forces thus produced are counterbalanced by the force created on the top surface 124 of the cap 98 by the sample fluid in the chamber 92. The counterbalancing force is larger than the unseating forces since the area of the surface 124 is substantially larger than the total area inside the passageways and conduits against which the sample fluid acts to produce forces tending to break the sealing engagements. Utilizing a typical unit which was constructed as an example, with the sample fluid in the space 92 under a pressure of 20 p.s.i., an upward force of 1.5 lbs. results in the groove 166 whereas a total force of 10 lbs. is exerted on the upper surface of the cap in a downward direction holding the sealing surfaces in contact. The net hydraulic force is transmitted down through the cap 98, the upper sealing member 102 and the rotating element 100 to the shaft assembly 22 which in turn transmits the force to the rotor and drive spindle underneath. Since the rotor drive mechanism is rubber-mounted, the force acting on the cap 98 moves the entire unit, comprising the seal cartridge 90, the shaft assembly 22, the rotor and the drive mechanism, downwardly a small distance. The sealing force therefore will be proportional to the pressure of the sample being processed and in this way seal wear is kept to a minimum while adequate sealing force is provided. Even if the sample is not present, the compression spring 106 provides the necessary biasing force to maintain the various sealing faces in engagement, even against the pressures generated by the coolant circulated through the cooling jacket.

As already stated, the spaces 92 and 94 above and below the cartridge 90 allow the cartridge to follow vertical or axial movements of the rotor and shaft assembly 22. The clearance space 95 external of the cartridge 90 allows it to tilt and translate laterally, within limits, in accordance with corresponding motions of the rotor and shaft assembly. The internal clearance spaces 156, 176 and 182 contribute by permitting a certain amount of tilting and lateral displacements of the rotating and non-rotating sealing elements 100, 102 and 104 substantially as a unit. The floating action thus provided assures that small axial, tilting or lateral movements (or combinations of such movements) of the rotor and shaft assembly will not cause excessive stresses to be applied to the cartridge 90 or the enclosure 50. Besides serving as seals, the O-rings 78, 120, 122, 140, 172 and 174 all function to center the elements with which they are associated and provide supports therefor to resiliently accommodate the various modes of translation.

Another feature of the present invention is the ease with which the seal cartridge may be cleaned without dismantling the cartridge assembly. This is made possible by the large coolant ports 112 and 114 which permit access to the seal area without disassembly. The possibility of damage to the lapped sealing surfaces through mishandling is thereby minimized.

It will be obvious to those skilled in the art that various modifications may be made to the specific exemplary embodiments of the invention described. While particular embodiments have been discussed, it will be understood that the invention is not limited thereto and that it is contemplated to cover in the appended claims any such modifications as fall within the true spirit and scope of the invention.

What is claimed is:

1. A seal cartridge for use with the sample supply and discharge assembly of a continuous flow centrifuge rotor comprising
   an enclosure;
   a sleeve disposed inside said enclosure;
   a cap secured over the top of said sleeve to form a housing, said cap having a lower surface and first and second through-passage means formed therein in communication with said lower surface;
   a sealing element disposed inside said housing and adapted for rotation about an axis, said element having upper and lower sealing faces oriented generally transverse of said axis, rotor shaft receiving means and passage means interconnecting said upper sealing face with said rotor shaft receiving means;
   an upper, nonrotatable sealing member in said sleeve interposed between said cap and said sealing element, said upper member having surfaces in sealing engagement with said lower surface of said cap and said upper sealing face of said sealing element, and passage means connecting said first and second passage means in said cap with said passage means in said sealing element, clearance spaces being provided above and around said upper sealing member;
   a lower, nonrotatable sealing member in said sleeve having an upper sealing surface held in sealing engagement with said lower sealing face of said sealing element, a clearance space being provided between said lower sealing member and said sleeve; and
   spring means disposed between said lower sealing member and said sleeve for biasing said lower sealing member, said sealing element and said upper sealing member into said sealing engagements.

2. A seal cartridge as defined in claim 1 which includes
   chamber means surrounding said sealing element for circulating a coolant about said sealing element; and in which
   said sleeve includes port means for conducting said coolant to and from said chamber means.

3. A seal cartridge as defined in claim 2, in which said first passage means in said cap is substantially coaxial of said axis and said second passage means in said cap comprises a series of passages oriented about said first passage means.

4. A seal cartridge for use with the sample supply and discharge shaft assembly of a continuous flow centrifuge rotor comprising
  an enclosure;
  a cylindrical sleeve disposed inside said enclosure and having a longitudinal central axis, upper and lower open ends, an inner wall and an inwardly-directed lip proximate the lower end;
  a cap threadedly secured to said upper end of said sleeve to form a housing, said cap having a lower surface disposed generally perpendicular to said axis, a through-passage coaxial with said axis and a series of through-passages surrounding said coaxial passage, all of said passages being in communication with said lower surface;
  a cylindrical sealing element disposed inside said housing coaxially therewith and adapted for rotation about said axis, said sealing element including a cavity for receiving said rotor shaft assembly, upper and lower sealing faces oriented generally perpendicular to said axis, a coaxial through-passage and a series of through-passages surrounding said coaxial passage, said cavity communicating with said lower sealing face and all of said passages interconnecting said upper sealing face and said cavity;
  an upper, cylindrically-shaped, nonrotatable sealing member in said sleeve interposed between said cap and said sealing element, said upper sealing member having a lower surface in sealing engagement with said upper sealing face of said sealing element and including a through-passage in registry with said coaxial through-passages in said cap and said sealing element and a series of through-passages in registry with both said series of through-passages in said cap and said sealing element, clearance spaces being provided above and around said upper sealing member to permit said member to tilt and move laterally, within limits, in said sleeve;
  an O-ring mounted on said upper sealing member in sealing contact with said inner wall of said sleeve;
  an O-ring mounted between said upper sealing member and said cap to isolate said coaxial passages from said passages surrounding said coaxial passages;
  a lower, ring-shaped, nonrotatable sealing member in said sleeve having a lower surface and an upper sealing surface, said latter surface being in sealing engagement with said lower sealing face of said sealing element, a clearance space being provided between said lower sealing member and said sleeve to permit said member to tilt and move laterally, within limits, in said sleeve;
  an O-ring, supported by said sleeve proximate said lower end of said sleeve, in sealing contact with the outside surface of said lower sealing member; and
  a spring compressed between said lip on said sleeve and said lower surface of said lower sealing member whereby said lower sealing member, said sealing element and said upper sealing member are biased into said sealing engagements.

5. A combination as defined in claim 4, in which
  an annular coolant chamber is defined between said sealing element and said sleeve; and
  said sleeve includes coolant inlet and outlet ports in the side wall thereof in communication with said annular chamber.

6. In a continuous flow centrifuge, the combination comprising
  a rotor;
  means engaging the lower end of said rotor for supporting and rotationally driving said rotor;
  a shaft assembly secured to the upper end of said rotor, said assembly defining sample inlet and outlet passage means in communication with portions of the interior of said rotor;
  a seal cartridge mounted on the upper end of said shaft assembly, comprising
    a sealing element affixed to the upper end of said shaft assembly for rotation therewith, said element including upper and lower sealing surfaces and inlet and outlet passage means in fluid communication with, respectively, said sample inlet and outlet passage means in said shaft assembly;
    upper and lower nonrotating seal members held in sealing engagement, respectively, with said upper and lower sealing surfaces of said sealing element, said upper seal member having sample inlet and outlet passage means in fluid communication, respectively, with said inlet and outlet passage means in said sealing element; and
    means for biasing said non-rotating seal members and said sealing element into pressurized sealing engagement;
  an outer, stationary enclosure surrounding said seal cartridge including sample inlet and outlet passage means in fluid communication, respectively, with said inlet and outlet passage means in said upper seal means; and
  resilient means interposed between said outer enclosure and said seal cartridge and clearances being provided between said seal cartridge and said outer enclosure whereby said seal cartridge is free to float inside said enclosure to resiliently accommodate, within limits, either singly or in combination, any axial, lateral and tilting movements of said rotor shaft assembly.

7. A combination as defined in claim 6, which includes a cooling jacket disposed about said sealing element; and coolant inlet and outlet passages in said outer housing communicating with said cooling jacket for conducting coolant to and from said cooling jacket, said resilient means acting to prevent leakage of said coolant from said cooling jacket.

8. A combination as defined in claim 6 in which
  said seal cartridge includes a sleeve for holding said sealing element and said upper and lower nonrotating seal means, said biasing means including a compression spring interposed between said sleeve and said lower seal means; and
  in which a chamber is defined by said enclosure over said seal cartridge, said chamber communicating with said sample inlet passage means in said enclosure and in said upper nonrotating seal means, the respective areas of said seal cartridge coming into contact with sample and coolant being such that a net force is produced during normal operating conditions which enhances the sealing engagement of said nonrotating seal means and said sealing element.

9. In a continuous flow centrifuge, the combination comprising
  a rotor;
  means engaging the lower end of said rotor for supporting and rotationally driving said rotor;
  a shaft assembly secured to the upper end of said rotor, said assembly defining sample inlet and outlet passage means, said passage means being in communication with the interior of said rotor;
  a seal cartridge surrounding the upper end of said shaft assembly including rotating sealing means attached to said upper end of said shaft assembly and nonrotating sealing means in sliding, sealing contact with said rotating sealing means, inlet and outlet passage means formed in said rotating and nonrotating sealing means in communication, respectively, with said inlet and outlet passage means in said shaft assembly; and
  an outer, stationary enclosure surrounding said seal cartridge including sample inlet and outlet passage means in fluid communication with said inlet and outlet passage means, respectively, in said non-rotating sealing means, clearance being provided between said seal cartridge and said enclosure whereby said seal cartridge is free to float inside said enclosure to accommodate, within limits, either singly or in combination, axial, lateral and tilting movements of said rotor shaft assembly.

10. A combination as defined in claim 9 which includes a cooling jacket defined between said outer enclosure and said rotating sealing means for conducting circulating coolant about said rotating sealing means; and resilient sealing means in said clearance space at the extremities of said jacket for resiliently accommodating said movements and preventing coolant leakage from said jacket.

11. A combination as defined in claim 9 which includes a chamber defined by said enclosure and the upper extremity of said seal cartridge, said chamber communicating exclusively with said sample inlet passage means in said enclosure and said inlet passage means in said nonrotating sealing means, the respective areas of said seal cartridge making contact with sample and coolant being such that a net force is produced during operation which enhances said sealing contact between said rotating element and said nonrotating sealing means.

12. In a continuous flow centrifuge, the combination comprising a rotor;

means engaging the lower end of said rotor for supporting and rotationally driving said rotor;

a shaft assembly secured to the upper end of said rotor, said assembly defining sample inlet passage means and sample outlet passage means, said passage means being in communication with the interior of said rotor;

a seal cartridge surrounding the upper end of said shaft assembly, comprising a cylindrical sleeve having a longitudinal central axis substantially coincident with the rotational axis of said rotor, upper and lower open ends, and an inwardly-directed lip proximate the lower end;

a cap threadedly secured to said upper end of said sleeve, said cap having a lower surface disposed substantially perpendicular to said axis, a through-passage coaxial with said axis and a series of through-passages surrounding said coaxial passage, all of said passages being in communication with said lower surface;

a cylindrical sealing element disposed inside said sleeve and coaxially therewith, and adapted for rotation about said axis, said sealing element including a cavity adapted to threadedly receive said rotor shaft assembly, upper and lower sealing faces oriented substantially perpendicular to said axis, a coaxial through-passage and a series of through-passages surrounding said coaxial passage, said cavity communicating with said lower sealing face, and all of said passages interconnecting said upper sealing face and said cavity;

an upper cylindrically-shaped, nonrotating sealing member in said sleeve interposed between said cap and said rotating sealing element, said upper sealing member having a lower surface in pressurized sealing engagement with said upper sealing face of said sealing element and including a through-passage in registry with said coaxial through-passages in said cap and said sealing element and a series of through-passages in registry with both said series of through-passages in said cap and said sealing element, clearance spaces being provided above and around said upper sealing member to permit said member to tilt and move axially and laterally, within limits, in said sleeve;

a lower, ring-shaped, nonrotating sealing member in said sleeve having a lower surface and an upper sealing surface, said upper sealing surface being in sealing engagement with said lower sealing face of said sealing element, a clearance space being provided about said lower sealing member to permit said member to tilt and move axially and laterally, within limits, in said sleeve; and a spring compressed between said lip on said sleeve and said lower surface of said lower sealing member whereby said lower sealing member, said sealing element and said upper sealing member are biased into said sealing engagements; and an outer, stationary enclosure surrounding said seal cartridge, including sample inlet and outlet passage means in fluid communication, respectively, with said inlet and outlet passage means in said cap.

13. A combination, as defined in claim 12, which includes resilient means and clearances being provided between said seal cartridge and said enclosure whereby said seal cartridge is free to float inside said enclosure to resiliently accommodate, within limits, either singly or in combination, axial, lateral and tilting movements of said rotor shaft assembly.

14. A combination as defined in claim 12 in which an annular cooling jacket is defined between said sealing element and said sleeve;

said sleeve includes coolant inlet and outlet ports in the side wall thereof in fluid communication with said cooling jacket; and said enclosure includes coolant inlet and outlet passages in fluid communication with said inlet and outlet ports of said sleeve.

15. A combination as defined in claim 13 including a chamber defined by said enclosure and the upper surface of said seal cartridge cap, said chamber communicating exclusively with said inlet passage means in said enclosure and said series of through-passages in said cap, the respective areas of said seal cartridge making contact with sample and coolant being such that a net force is produced during operation which biases said cap and said upper, nonrotating sealing member towards said rotating sealing element, thereby enhancing the sealing engagement therebetween.

16. In a fluid coupling for connecting the rotating rotor of a continuous flow centrifuge with stationary sample supply and discharge apparatus, the combination comprising a shaft assembly secured to the upper end of said rotor, said assembly defining sample inlet conduit means and sample outlet conduit means, both said passage means being in fluid communication with portions of the interior of said rotor;

a stationary enclosure positioned about the upper end of said shaft assembly, said enclosure having a sample inlet and a sample outlet connecting the interior of said enclosure with the exterior for coupling to external sample inlet and outlet lines;

a seal cartridge mounted on said upper end of said shaft assembly inside said enclosure, the upper extremity of said cartridge and said enclosure defining a chamber, said cartridge being vertically movable, within limits, with said shaft assembly and including a rotating sealing element secured to said upper end of said shaft assembly and having an upper sealing face;

nonrotating sealing means having a lower surface in sealing engagement with said upper sealing face of said rotating element;

sample inlet passage means in said rotating sealing element and said nonrotating sealing means disposed to bring into fluid communication said sample inlet of said enclosure, said chamber and said sample inlet conduit means of said shaft assembly; and sample outlet passage means in said rotating sealing element and in said nonrotating sealing means for bringing into fluid communication said sample outlet of said enclosure and said sample outlet passage means of said shaft assembly, the respective areas of said upper surface of said sealing cartridge and said sample inlet passage means being such that the pressure of said fluid sample being processed forces said nonrotating sealing means into pressurized sealing engagement with said rotating sealing element.

17. A combination, as defined in claim 16, including clearance spaces and resilient means about said sealing cartridge and said nonrotating sealing means to resiliently accommodate, within limits, either singly or in combination, axial, lateral and tilting movements of said rotor shaft assembly.

References Cited

UNITED STATES PATENTS 3,292,937  12/1966  Nunley _____ 233—21 XR

HENRY T. KLINKSIEK, *Primary Examiner.*

U.S. Cl. X.R.

277—59; 285—41, 134, 190